(12) United States Patent
Kang

(10) Patent No.: US 9,688,145 B2
(45) Date of Patent: Jun. 27, 2017

(54) TERMINAL, VEHICLE HAVING THE SAME AND METHOD OF CONTROLLING THE SAME

(71) Applicant: Hyundai Motor Company, Seoul (KR)

(72) Inventor: Ki Dong Kang, Seoul (KR)

(73) Assignee: Hyundai Motor Company, Seoul (KR)

( * ) Notice: Subject to any disclaimer, the term of this patent is extended or adjusted under 35 U.S.C. 154(b) by 78 days.

(21) Appl. No.: 14/752,951

(22) Filed: Jun. 28, 2015

(65) Prior Publication Data

US 2016/0159218 A1  Jun. 9, 2016

(30) Foreign Application Priority Data

Dec. 9, 2014   (KR) .......................... 10-2014-0175770

(51) Int. Cl.
*B60K 35/00* (2006.01)
*B60K 37/06* (2006.01)

(52) U.S. Cl.
CPC .............. *B60K 35/00* (2013.01); *B60K 37/06* (2013.01); *B60K 2350/357* (2013.01); *B60K 2350/906* (2013.01)

(58) Field of Classification Search
CPC .. B60K 35/00; B60K 37/06; B60K 2350/906; B60K 2350/357
See application file for complete search history.

(56) References Cited

U.S. PATENT DOCUMENTS

| 6,282,475 | B1* | 8/2001 | Washington | ............ | B60R 25/04 296/65.16 |
| 2010/0176914 | A1* | 7/2010 | Moraes | .................. | B60K 37/06 340/3.1 |
| 2013/0238190 | A1* | 9/2013 | Yasuda | .................. | G01C 21/36 701/36 |

(Continued)

FOREIGN PATENT DOCUMENTS

| JP | 2007-069662 A | 3/2007 |
| JP | 2007-124331 A | 5/2007 |

(Continued)

OTHER PUBLICATIONS

Notice of Patent Allowance for Korean Patent Application No. 10-2014-0175770, dated May 4, 2016, English Abstract, 7 pages.

*Primary Examiner* — Rodney Butler
(74) *Attorney, Agent, or Firm* — Mintz Levin Cohn Ferris Glovsky and Popeo, P.C.; Peter F. Corless

(57) ABSTRACT

A terminal includes: a storage unit configured to store a plurality of pieces of software, each having a function restriction level and in which a plurality of functions are selectively restricted, and store a plurality of applications; a communication unit configured to receive driving information of a vehicle and external environment information; a control unit configured to identify a function restriction level corresponding to a driving condition of the vehicle based on the received driving information and external environment information, determine software corresponding to the identified function restriction level, and restrict and control a (Continued)

function of at least one application of the plurality of stored applications using the determined software; and an output unit configured to output execution information of the at least one application whose function is restricted and controlled.

17 Claims, 22 Drawing Sheets

(56) References Cited

U.S. PATENT DOCUMENTS

| | | | |
|---|---|---|---|
| 2015/0154728 A1* | 6/2015 | Nara | G06F 3/0488 345/157 |
| 2015/0234665 A1* | 8/2015 | Matsuyuki | G06F 9/445 701/36 |

FOREIGN PATENT DOCUMENTS

| | | |
|---|---|---|
| JP | 2012-217097 A | 11/2012 |
| JP | 2014-137280 A | 7/2014 |
| KR | 10-2002-0015450 | 12/2003 |
| KR | 10-0793114 | 1/2008 |
| KR | 10-2014-0014718 A | 2/2014 |

* cited by examiner

FIG. 7A

| DRIVING INFORMATION OF VEHICLE (4) | | | | | |
|---|---|---|---|---|---|
| DRIVING SPEED | WEIGHT | STEERING ANGLE | WEIGHT | DRIVING DIRECTION | WEIGHT |
| 0km | 1 | 0~5° | 1 | DRIVE | 1 |
| 0~10km | 2 | 5~10° | 2 | REVERSE | 2 |
| 10~30km | 3 | 10~30° | 3 | | |
| 30~60km | 4 | 30~90° | 4 | | |
| 60~100km | 5 | 90~130° | 5 | | |
| 100km~ | 6 | 130~180° | 6 | | |

FIG. 7B

| STATE INFORMATION OF DRIVER (3) | | | | | |
|---|---|---|---|---|---|
| SIGHT LINE DIRECTION | WEIGHT | DEGREE OF CONCENTRATION | WEIGHT | SPEAKING | WEIGHT |
| FORWARD | 1 | HIGH | 1 | NO | 1 |
| LEFT AND RIGHT | 2 | MEDIUM | 2 | YES | 2 |
| BACKWARD | 3 | LOW | 3 | | |

FIG. 7C

| ENVIRONMENT INFORMATION (2) | | | |
|---|---|---|---|
| ROAD TYPE | WEIGHT | WEATHER | WEIGHT |
| LOCAL ROAD | 1 | CLEAR | 1 |
| UNPAVED ROAD | 2 | RAIN | 2 |
| GENERAL ROAD | 3 | SNOW | 3 |
| HIGHWAY | 4 | | |

FIG. 7D

| PASSENGER INFORMATION (1) | | | |
|---|---|---|---|
| BOARDED | WEIGHT | PASSENGER MANIPULATION | WEIGHT |
| YES | 1 | YES | 1 |
| NO | 2 | NO | 2 |

TERMINAL, VEHICLE HAVING THE SAME AND METHOD OF CONTROLLING THE SAME

CROSS-REFERENCE TO RELATED APPLICATION

This application claims priority to and the benefit of Korean Patent Application No. 10-2014-0175770, filed on Dec. 9, 2014 in the Korean Intellectual Property Office, the disclosure of which is incorporated herein in its entirety by reference.

BACKGROUND

1. Technical Field

Embodiments of the present disclosure relate to a terminal for performing audio, video and navigation functions, a vehicle having the same and a method of controlling the same.

2. Description of the Related Art

Vehicles typically include a cluster for displaying driving information, such as a vehicle speed, revolutions per minute (RPM) of an engine, an amount of oil, a coolant level, and the like. In addition, vehicles include additional functions for user convenience, typically relating to audio, video, navigation, air conditioning control, seat control, lighting control, and the like. Such vehicles may include an audio-video-navigation (AVN) device in which navigation, audio, and video functionality are integrated. The AVN device may further enable digital media broadcasting (DMB) functionality and may communicate with a terminal of a user.

In this regard, when a device for displaying a dynamic image is used in the vehicle while driving, a driver may become distracted, potentially causing a traffic accident. Accordingly, in order to prevent accidents and promote safe driving, it is beneficial to restrict the use of such a terminal that may distract the driver while driving.

SUMMARY

The present disclosure provides a terminal for gradually restricting a function of an application based on driving information and environment information, and/or boarding information of a user, a vehicle having the same and a method of controlling the same. The present disclosure also provides a terminal including software for gradually restricting a function of an application, a vehicle having the same and a method of controlling the same.

According to embodiments of the present disclosure, there is provided a terminal, including: a storage unit configured to store a plurality of pieces of software, each having a function restriction level and in which a plurality of functions are selectively restricted, and store a plurality of applications; a communication unit configured to receive driving information of a vehicle and external environment information; a control unit configured to identify a function restriction level corresponding to a driving condition of the vehicle based on the received driving information and external environment information, determine software corresponding to the identified function restriction level, and restrict and control a function of at least one application of the plurality of stored applications using the determined software; an output unit configured to output execution information of the at least one application whose function is restricted and controlled.

The communication unit may be further configured to receive state information of a driver of the vehicle and boarding information of a passenger of the vehicle, and the control unit may be further configured to identify the state information of the driver and the boarding information of the passenger when the function restriction level is identified.

The driving information may include information relating to one or more of a speed of the vehicle, a driving direction of the vehicle, and a steering angle of the vehicle, the environment information may include information relating to one or more of a type of a road on which the vehicle travels and weather information indicating a weather condition, and the state information of the driver may include information relating to one or more of a sightline of the driver, a voice of the driver, and a degree of concentration of the driver.

The storage unit may be further configured to store a weight for each range of the speed of the vehicle, a weight for each driving direction of the vehicle, a weight for each range of the steering angle of the vehicle, a weight for each type of the road, a weight for each weather condition, a weight for each sightline of the driver, a weight based on whether the driver is or is not speaking, a weight for each degree of concentration of the driver, a weight based on whether a passenger has or has not boarded the vehicle, and a weight based on whether the passenger is or is not manipulating the terminal, and the control unit may sum the stored weights and determine the driving condition of the vehicle based on the summed weight.

The storage unit may be further configured to store a priority of the driving information, a priority of the environment information, a priority of the state information of the driver, a priority of the boarding information, and a weight corresponding to the priorities.

The control unit may be further configured to enable each of an input function, a display function, and a sound function when the summed weight is less than or equal to a predetermined value and restrict at least one of the input function, the display function, and the sound function when the summed weight is greater than the predetermined value.

The plurality of pieces of software may include first software for enabling each of an input function, a display function, and a sound function, second software for restricting the input function and enabling the display function and the sound function, third software for restricting the input function and the sound function and enabling the display function, fourth software for restricting the input function and the display function and enabling the sound function, and fifth software for restricting each of the input function, the display function, and the sound function, and the first software may correspond to a first function restriction level, the second software may correspond to a second function restriction level, the third software may correspond to a third function restriction level, the fourth software may correspond to a fourth function restriction level, and the fifth software may correspond to a fifth function restriction level.

The control unit may be further configured to perform control such that a function of a default application is maintained when a function of the at least one application is restricted and the at least one application is the default application.

Furthermore, according to embodiments of the present disclosure, there is provided a vehicle, including: an information collecting unit configured to collect driving information of a vehicle and external environment information; a storage unit configured to store a plurality of pieces of software each having a function restriction level and in which a plurality of functions are selectively restricted; a communication unit configured to receive the driving information of the vehicle and the external environment information; a control unit configured to identify a function restriction level corresponding to a driving condition of the vehicle based on the driving information and the external environment information and determine software corresponding to the identified function restriction level; and a terminal configured to store a plurality of applications, restrict and control a function of at least one application of the plurality of stored applications using the determined software and output execution information of the at least one application whose function is restricted and controlled.

The terminal may include the storage unit, the communication unit, and the control unit.

The vehicle may further include a head unit in which the storage unit, the communication unit, and the control unit are included, and the communication unit may be further configured to communicate with the terminal.

The communication unit may be further configured to receive state information of a driver of the vehicle and boarding information of a passenger of the vehicle, and the control unit may be further configured to identify the state information of the driver and the boarding information of the passenger when the function restriction level is identified.

The driving information may include information relating to one or more of on a speed of the vehicle, a driving direction of the vehicle, and a steering angle of the vehicle, the environment information may include information relating to one or more of a type of a road on which the vehicle travels and weather information indicating a weather condition, and the state information of the driver may include information relating to one or more of a sightline of the driver, a voice of the driver, and a degree of concentration of the driver.

The storage unit may be further configured to store a weight for each range of the speed of the vehicle, a weight for each driving direction of the vehicle, a weight for each range of the steering angle of the vehicle, a weight for each type of the road, a weight for each weather condition, a weight for each sightline of the driver, a weight based on whether a driver is or is not speaking, a weight for each degree of concentration of the driver, a weight based on whether a passenger has or has not boarded the vehicle, and a weight based on whether the passenger is or is not manipulating the terminal, and the control unit may be further configured to sum the stored weights and determine the driving condition of the vehicle based on the summed weight.

The storage unit may be further configured to store a priority of the driving information, a priority of the environment information, a priority of the state information of the driver, a priority of the boarding information, and a weight corresponding to the priorities.

The control unit may be further configured to enable each of an input function, a display function, and a sound function when the summed weight is less than or equal to a predetermined value and restrict at least one of the input function, the display function, and the sound function when the summed weight is greater than the predetermined value.

The control unit may be further configured to perform control such that a function of a default application is maintained when a function of the at least one application is restricted and controlled and the at least one application is the default application.

Furthermore, according to embodiments of the present disclosure, there is provided a method of controlling a vehicle, including: supplying power to a terminal when the vehicle starts; collecting driving information of the vehicle, external environment information, and boarding information of a user of the vehicle; identifying a function restriction level corresponding to a driving condition of the vehicle based on the collected driving information of the vehicle, external environment information and boarding information of the user; determining software corresponding to the identified function restriction level; identifying at least one application to be executed in the terminal; and controlling execution of the identified at least one application using the determined software by restricting and controlling at least one of an input function, a display function, and a sound function of the identified at least one application.

The driving information may include information relating to one or more of a speed of the vehicle, a driving direction of the vehicle, and a steering angle of the vehicle, the environment information may include information relating to one or more of a type of a road on which the vehicle travels and weather information indicating a weather condition, and the state information of the driver may include information relating to one or more of a sightline of the driver, a voice of the driver, and a degree of concentration of the driver.

The identifying of the function restriction level may include: identifying a weight for each range of speed of the vehicle, a weight for each driving direction, a weight for each range of steering angle of the vehicle, a weight for each type of the road, a weight for each weather condition, a weight for each sightline of the driver, a weight based on whether the driver is or is not speaking, a weight for each degree of concentration of the driver, a weight based on whether a passenger has or has not boarded the vehicle, and a weight based on whether the passenger is or is not manipulating the terminal; summing the identified weights; and determining the driving condition of the vehicle based on the summed weight.

The method may further include identifying a priority of the driving information, a priority of the environment information, a priority of the state information of the driver, and a priority of the boarding information; and determining the driving condition of the vehicle using a weight corresponding to the identified priorities.

The controlling of execution of the identified at least one application may include: enabling each of the input function, the display function, and the sound function when the summed weight is less than or equal to a predetermined value; and restricting at least one of the input function, the display function, and the sound function when the summed weight is greater than the predetermined value.

The restricting of at least one of the input function, the display function, and the sound function when the summed weight is greater than the predetermined value, may include: determining whether the at least one application is a navigation application; and restricting and controlling an input function of a navigation function of the at least one application when the at least one application is the navigation application.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7A is an exemplary diagram showing weights for each driving speed range, weights for each steering angle range, and weights for each driving direction that represent driving information of a vehicle; FIG. 7B is an exemplary diagram showing weights for each sightline direction, weights for each degree of concentration and weights to be applied when a driver is and is not speaking that represent state information of the driver; FIG. 7C is an exemplary diagram showing weights for each road type and weights for each weather condition that represent external environment information; FIG. 7D is an exemplary diagram showing weights to be applied when a passenger has and has not boarded and weights for each manipulation intention that represent passenger information;

DETAILED DESCRIPTION OF THE EMBODIMENTS

Figure 1:
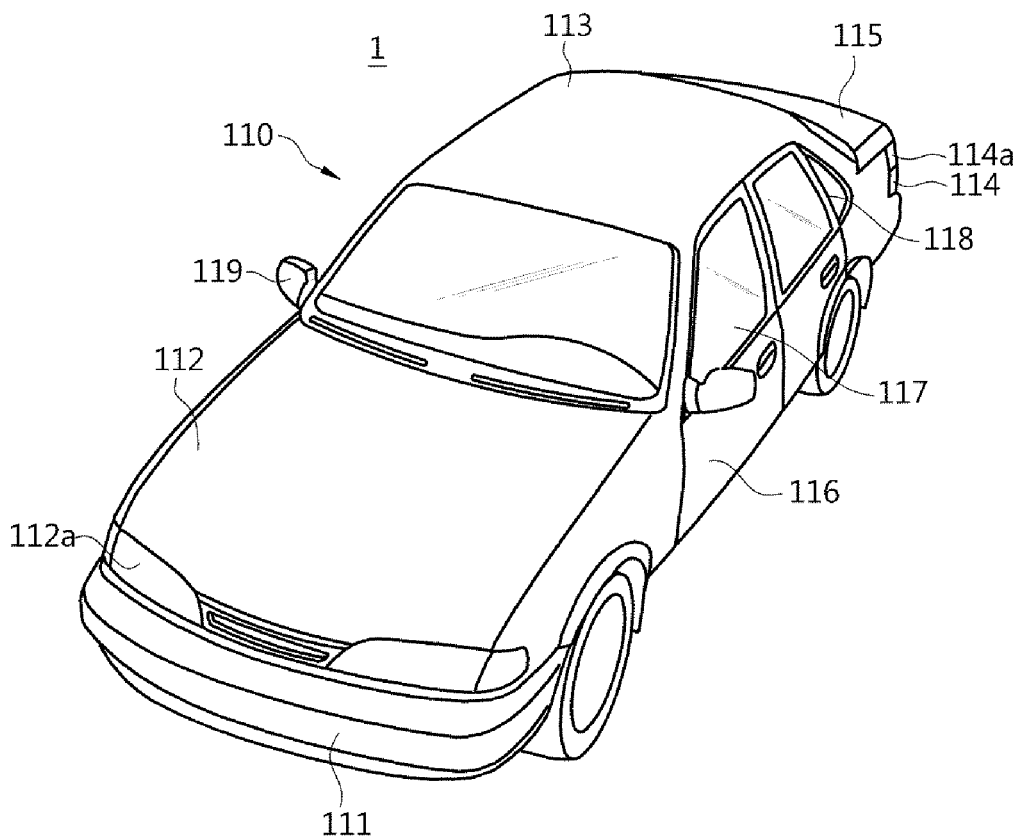
FIG. 1 is an exemplary diagram of a vehicle in which a terminal according to embodiments of the present disclosure is provided therein.

Hereinafter, the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Figure 2:
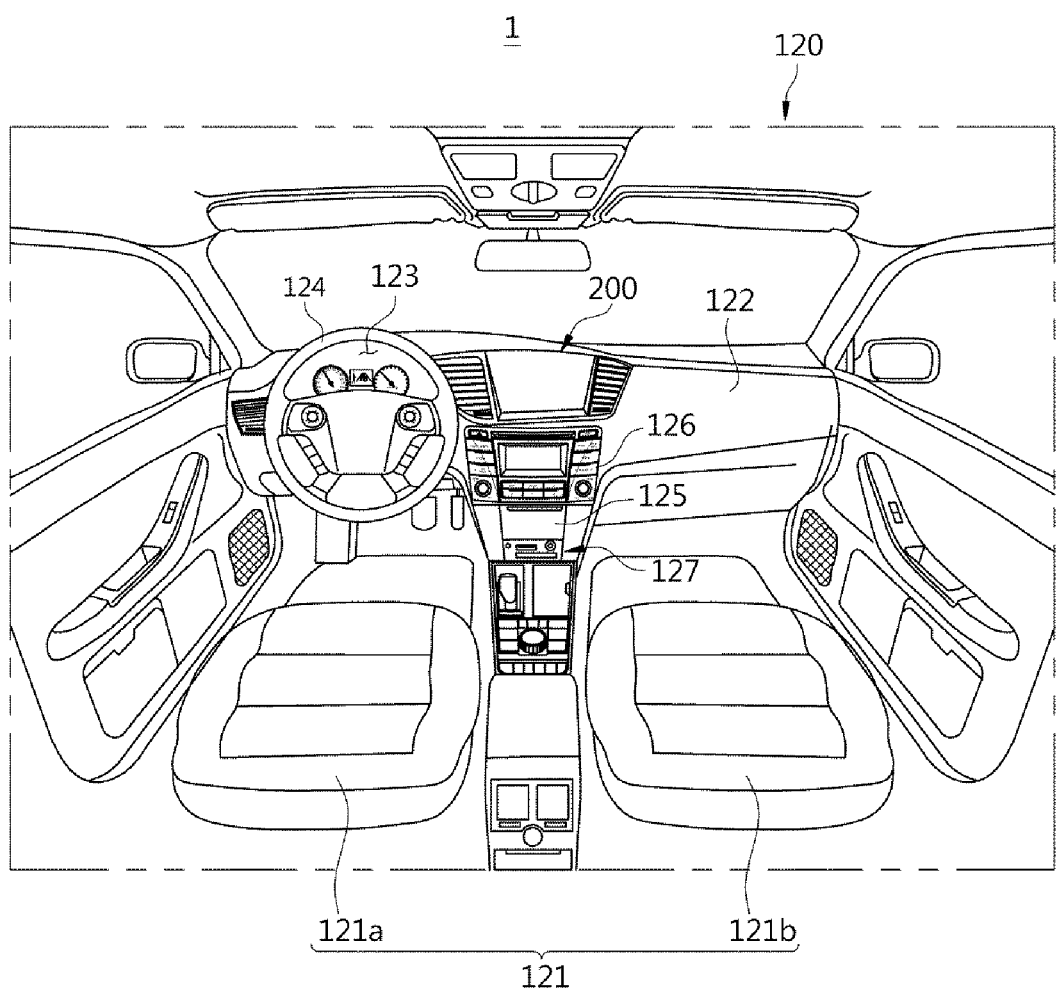
FIG. 2 is a diagram illustrating an exemplary inside of the vehicle in which the terminal according to embodiments of the present disclosure is provided.

FIG. 1 is an exemplary diagram of a vehicle in which a terminal according to embodiments of the present disclosure is provided therein. FIG. 2 is a diagram illustrating an exemplary inside of the vehicle in which the terminal according to embodiments of the present disclosure is provided.

A vehicle 1 is a device that moves by driving wheels in order to transport a human or goods and moves on roads. The vehicle 1 includes a body including an interior part and an exterior part and a chassis that is the remaining part when excluding the body and in which a mechanical device necessary for driving is installed.

As illustrated in FIG. 1, an exterior part 110 of the body includes a front panel 111, a hood 112, a roof panel 113, a rear panel 114, a trunk 115, front, rear, left and right doors 116, a window-glass 117 that is installed at the front, rear, left and right doors 116 and is opened or closed according to a user's need and the like.

Also, the vehicle further includes a headlight 112a that is provided at the hood 112 and illuminates a road ahead and a tail light 114a that is provided at the rear panel 114 and illuminates a road behind. In addition, the exterior part of the body further includes pillars 118 that are provided in a boundary among the front panel, the hood, the roof panel, the rear panel, the trunk and the front, rear, left and right glass windows. Also, the window-glass further includes a side glass window, a quarter window-glass that is installed between the pillars and is unable to be opened or closed, a rear window-glass installed at a rear side, and a front window-glass installed at a front side. The exterior part of the body further includes a side mirror 119 configured to provide a rear view of the vehicle 1 to a driver and the like.

As illustrated in FIG. 2, an interior part 120 of the body includes a seat 121 on which a passenger sits, a dashboard 122, an instrument panel (that is, a cluster 123) that is provided on the dashboard and in which a tachometer, a speedometer, a coolant thermometer, a fuel system, a direction switch indicating lamp, a high beam indicating lamp, a warning lamp, a seat belt warning lamp, a distance recorder, an odometer, an automatic transmission selection lever indicating lamp, a door open warning lamp, an engine oil warning lamp, a fuel shortage warning lamp and the like are provided, a steering wheel 124 configured to steer a vehicle direction, a center fascia 125 that is located between a driver's seat 121a and a passenger's seat 121b and includes an adjustment plate of an air conditioning unit, and the like.

The seat 121 includes the driver's seat 121a on which a driver sits, the passenger's seat 121b on which a passenger sits, and a back seat that is located at the rear side inside the vehicle. The cluster 123 may be implemented as a digital type. That is, the digital type cluster displays vehicle information and driving information as an image.

The vehicle 1 further includes a head unit 126 that is provided in the center fascia 125 and controls an audio device, the air conditioning unit and a heater. The vehicle 1 further includes a multi terminal unit 127 that is provided in the center fascia 125 and to which an external device is connected, and communicates with the external device.

A terminal 200 configured to perform a multimedia function may be disposed in the center fascia 125. The multi terminal unit 127 is disposed at a location adjacent to the head unit 126 or may be adjacently disposed to the terminal 200, and may be electrically connected to the terminal 200 through a connector or a cable. That is, the multi terminal unit 127 enables data communication between the terminal 200 and the external device.

The terminal 200 performs an audio function of outputting an audio signal and a video function of outputting a video signal, and may perform a navigation function of computing a current location of the vehicle based on location information provided from a plurality of satellites and displaying the current location by mapping it on a map. The terminal 200 will be described in further detail below.

The chassis of the vehicle includes a power generating device, a power delivering device, a driving device, a steering device, a braking device, a suspension device, a transmission device, a fuel device, front, rear, left and right wheels and the like. Also, the vehicle includes several safety devices for the driver and passenger's safety. The safety device of the vehicle includes several types of safety devices such as an airbag control device configured to ensure safety of the passenger such as the driver in the event of a vehicle crash, an electronic stability control (ESC) device configured to control an orientation of the vehicle when the vehicle accelerates or turns, and the like.

In addition, the vehicle 1 may further include a detecting device such as a proximity sensor configured to detect obstacles at the side or rear thereof or another vehicle, a rain sensor configured to detect rainfall and precipitation, a temperature sensor configured to detect a temperature inside or outside the vehicle, a boarding identification sensor configured to detect whether a user is sitting on the driver's seat or the passenger's seat, a wheel speed sensor configured to detect a wheel speed of the vehicle, and a steering angle sensor configured to detect a rotation angle of the steering wheel.

The vehicle 1 further includes an electronic control unit (ECU) configured to control driving of the power generating device, the power delivering device, the driving device, the steering device, the braking device, the suspension device, the transmission device, the fuel device, and several safety devices based on detection information transmitted from various detecting devices. The ECU may serve as an information collecting unit 130 configured to provide information for output control of the terminal 200.

Also, the vehicle 1 may further include an electronic device such as a hands free device, a GPS, a Bluetooth device, a rear view camera, a terminal charging device a high-pass device, and the like, which are installed for a driver's convenience.

The vehicle further includes a starter button for inputting an operation command to a starter motor (not illustrated). That is, the vehicle operates the starter motor (not illustrated) when the starter button is turned on and drives an engine (not illustrated) that is the power generating device through an operation of the starter motor. The vehicle further includes a battery (not illustrated) that is electrically connected to a multimedia reproducing device, the audio device, a courtesy light, the starter motor and other electronic devices and provides driving power. The battery performs charge using a self-generator or power of the engine while driving.

Figure 3:
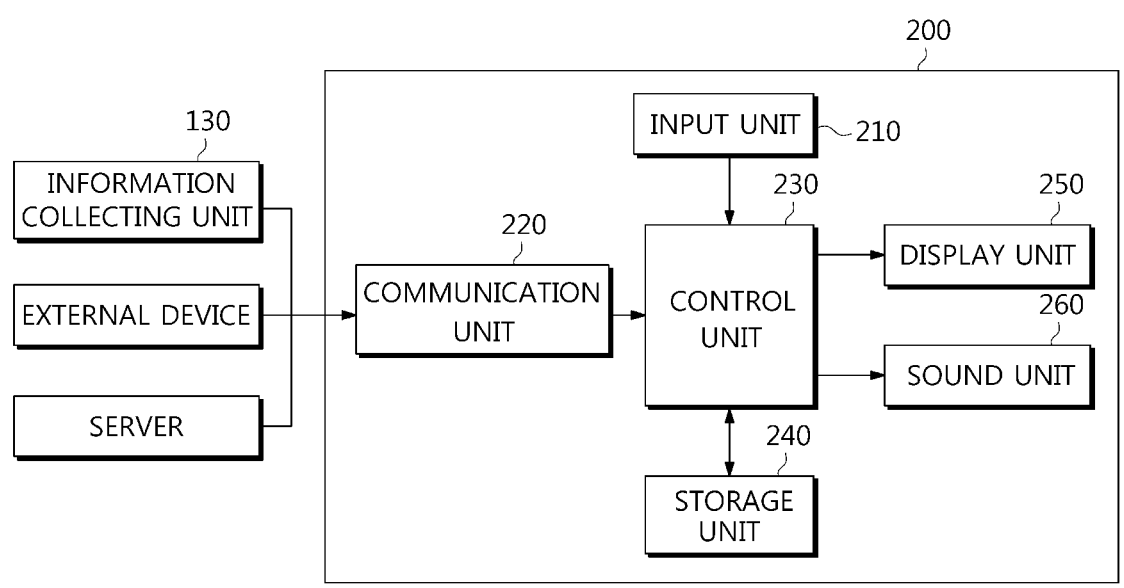
FIG. 3 is a control configuration diagram of a terminal according to embodiments of the present disclosure.

FIG. 3 is a control configuration diagram of a terminal according to embodiments of the present disclosure.

The terminal 200 includes an input unit 210, a communication unit 220, a control unit 230, a storage unit 240 and output units 250 and 260. The input unit 210 receives a command from the user and transmits an input signal to the control unit 230. The input unit 210 may be implemented as a touch panel that is integrally provided in the display unit 250 of the terminal or may be implemented as a plurality of keys that are provided in the head unit 126. That is, the input unit 210 transmits a location signal of a touch point at which the touch panel is touched to the control unit 230 and transmits a manipulation signal of any key among the plurality of keys to the control unit 230. Also, the input unit 210 is provided in the center fascia 125 or may be implemented as a jog dial, a button unit or a touch pad configured to input a movement command of a cursor and a selection command of an icon button that are displayed on the display unit 250 and the like.

The jog dial may be linearly moved in front, rear, left and right directions, linearly moved up and down, and rotatably moved in a clockwise direction and a counter-clockwise direction by the user, transmit a linear movement signal in front, rear, left and right directions and a rotation signal in a rotation direction that are manipulated by the user to the control unit 230 and transmit a pressure signal in a vertical direction to the control unit 230.

The touch pad transmits a signal of a touch location touched by the user to the control unit 230, and the button unit transmits a signal of a button that is pressed by the user among a plurality of buttons to the control unit 230. The plurality of buttons may include power, menus, escape (ESC), a navigation function, a media function, a DMB function, a trip function and the like.

The communication unit 220 communicates with a global positioning system (GPS) (not illustrated) and transmits a received current location to the control unit 230. The GPS receives location signals from a plurality of GPS satellites, computes a location thereof, that is, a location of the vehicle, and transmits the result to the communication unit 220. The communication unit 220 communicates with a server and the external device via a wired and/or wireless communication network. The wired and/or wireless communication network includes a broadcasting network, for example, SXM, RDS and TPEG such as DMB. The communication unit 220 may communicate with the external device that is connected to the multi terminal unit 127 and the like. The external device includes a handheld user terminal. The communication unit 220 further perform universal serial bus (USB) communication, and may transmit a setup program, various pieces of update information and the like that are received through USB communication to the control unit 230.

The communication unit 220 receives various pieces of information on the inside of the vehicle and transmits the received information to the control unit 230. The received information is information that is used for operation control of the output unit of the terminal 200, and may be information that is transmitted from the plurality of sensors of the vehicle or information transmitted from the electronic control unit (ECU). In addition, the received information is information in which integral signal processing of a plurality of pieces of information is performed. The communication unit 220 performs any communication among a controller area network (CAN), media oriented systems transport (MOST), and a radio frequency (RF).

Figure 4:
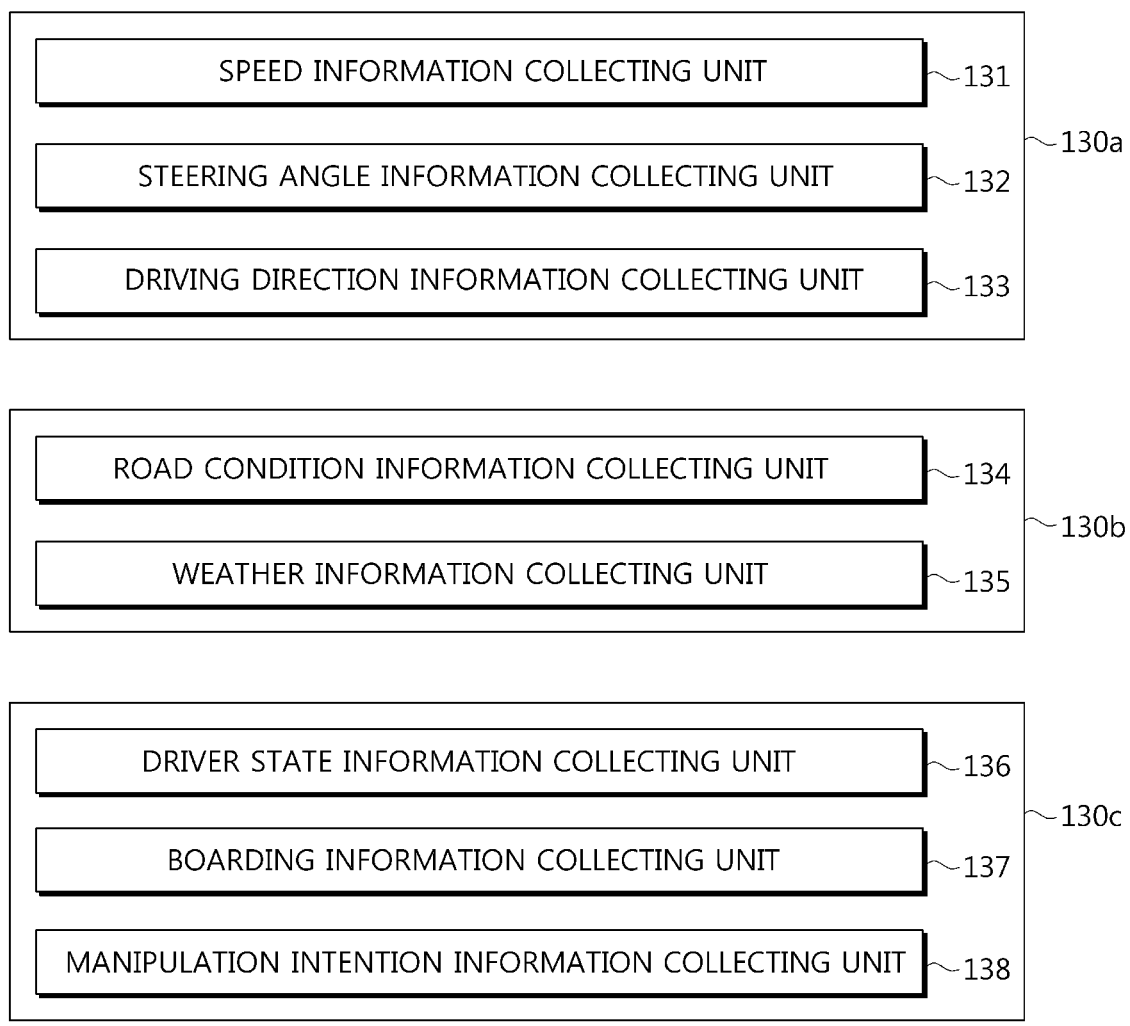
FIG. 4 is a detailed exemplary diagram of an information collecting unit configured to provide information to the terminal according to embodiments of the present disclosure.

The information collecting unit 130 collects a plurality of pieces of information for operation control of the output unit. As illustrated in FIG. 4, the information collecting unit 130 includes a driving information collecting unit 130a configured to collect driving information of the vehicle, an environment information collecting unit 130b configured to collect external environment information of the vehicle, and a user information collecting unit 130c configured to collect driver and passenger information. The driving information collecting unit 130a includes a speed information collecting unit 131 configured to collect a speed of the vehicle transmitted from the wheel speed sensor, a steering angle information collecting unit 132 configured to collect a steering angle of the steering wheel transmitted from the steering angle sensor and a driving direction information collecting unit 133 configured to collect driving direction information of the vehicle. The driving direction of the vehicle may be obtained based on a state of a direction indicator for a left turn and a right turn on and a location of a shift lever indicating drive (D), reverse (R), neutral (N) and park (P). In addition, the driving direction may be estimated based on detection information transmitted from the wheel speed sensor, an accelerometer sensor, a yaw sensor or a gyro sensor.

The environment information collecting unit 130b includes a road condition information collecting unit 134 configured to collect road condition information corresponding to a type of a road and a weather information collecting unit 135 configured to collect weather information. The road condition information collecting unit 134 identifies a type of the road on which the vehicle is currently located based on location information of the vehicle transmitted from the GPS and estimates a road condition from the determined type of the road. In addition, the road condition information may further include a curved road, a straight road, a dangerous area, an area of caution, areas of frequent accidents and the like. Also, the weather information collecting unit 135 obtains rain or snowfall information from current location information transmitted from the GPS and weather information provided from the Internet, or obtains rain information based on detection information transmitted from the rain sensor.

The user information collecting unit 130c includes a driver state information collecting unit 136 configured to collect state information of the driver, a boarding information collecting unit 137 configured to receive detection information transmitted from the boarding identification sensor in the driver's seat and the passenger's seat and collect boarding information of the driver and the passenger based on the received detection information, and a manipulation intention information collecting unit 138 configured to collect manipulation intention information of the user who desires to input information to the terminal.

The driver state information collecting unit 136 obtains sightline information of the driver based on an image transmitted from an image collecting unit (not illustrated) configured to obtain an image of the driver. Also, the driver state information collecting unit 136 collects speaking information (i.e., voice information) of the driver based on sound information transmitted from a sound collecting unit (not illustrated). The driver state information collecting unit 136 estimates a driving degree of concentration of the driver based on a sightline of the driver and speaking of the driver. That is, state information of the driver may include information relating to one or more of the sightline, the speaking, and the degree of concentration of the driver.

The manipulation intention information collecting unit 138 identifies whether a user who desires to input information to the terminal is the driver or the passenger based on detection information transmitted from the proximity sensor or image information transmitted from the image collecting unit. In addition, the manipulation intention information collecting unit 138 may identify a user who desires to input information to the terminal based on audio information transmitted from a sound collecting unit (not illustrated). Also, the manipulation intention information collecting unit 138 may identify a user who desires to input information to the terminal based on button manipulation information transmitted from a pre-designated button (not illustrated).

When the vehicle starts, the control unit 230 enables power for driving of each component to be supplied and controls execution of at least one application among a plurality of applications based on an input signal input to the input unit 210. The input signal of the input unit is a signal at a touch location at which the touch panel is touched. In addition, the input signal of the input unit may be a signal of the button unit, a signal of the jog dial or a signal of the touch pad.

The control unit 230 performs control such that, when the user does not select an application before driving, a waiting screen is displayed or a map within a predetermined range based on the location of the vehicle is displayed. The control unit 230 identifies an application input by the user before driving, controls execution of the identified application, and when it is determined that the application is changed, controls execution of the changed application. For example, the control unit 230 performs control such that, when a navigation serving as a default application is performed and a destination is input, requests a route search from a server, and when the route found by the server is transmitted, guidance on a path is provided based on the received route.

The control unit 230 determines a driving condition of the vehicle based on at least two pieces of information among driving information, environment information and user information, identifies a function restriction level corresponding to the determined driving condition, determines software corresponding to the identified function restriction level, and restricts and controls a function of an application that is being executed among the plurality of applications using the determined software. The restricting and controlling of a function of an application that is being executed includes gradually restricting and controlling a function according to the function restriction level while output operations of the output units 250 and 260 are controlled. The driving information includes information on a speed, a driving direction and a steering angle of the vehicle, the environment information includes a type of a road on which the vehicle travels and weather information, the state information of the driver includes a sightline, speaking and a degree of concentration of the driver, and the user information includes boarding of the passenger and manipulation (e.g., of the terminal) by the passenger. More specifically, the control unit 230 identifies a weight for each speed range of the vehicle, a weight for each driving direction, a weight for each steering angle range, a weight for each type of the road, a weight for each weather condition, a weight for each sightline of the driver, a weight to be applied when a driver is or is not speaking, a weight for each degree of concentration of the driver, a weight to be applied when a passenger has or has not boarded, and a weight to be applied when a passenger is or is not manipulating the terminal, sums the identified weights, and identifies a function restriction level corresponding to the summed weight.

In addition, the control unit 230 may identify priorities of the driving information, the environment information, the driver information and the passenger information, and further apply a weight corresponding to the priority. The control unit 230 may enable each of an input function, a display function and a sound function when the summed weight is less than a predetermined value and may restrict at least one function of the input function, the display function and the sound function when the summed weight is equal to or greater than the predetermined value. The control unit 230 may perform control such that all functions of a default application are maintained when an application that is being executed is the default application (e.g., a navigation application), and only the input function is restricted when the summed weight is equal to or greater than the predetermined value. The control unit 230 performs control such that, when the input function is restricted, a display of an icon for inputting is restricted or the input unit is inactivated, when the display function is restricted, an image display of the display unit is restricted, and when the sound function is restricted, a sound output of a sound unit is restricted.

Figure 5:
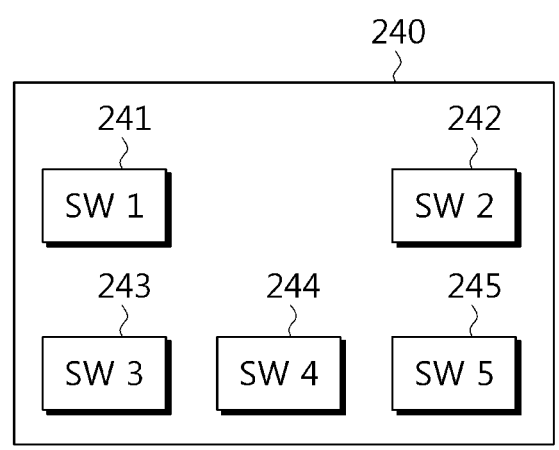
FIG. 5 is a detailed exemplary diagram of a storage unit provided in the terminal according to embodiments of the present disclosure.

The storage unit 240 stores a plurality of applications and stores a plurality of pieces of software for selectively restricting a plurality of functions of the application. As illustrated in FIG. 5, the plurality of pieces of software stored in the storage unit 240 include first software 241 for enabling each of the input function, the display function and the sound function, second software 242 for restricting the input function and enabling only the display function and the sound function, third software 243 for restricting the input function and the sound function and enabling the display function, fourth software 244 for restricting the input function and the display function and enabling the sound function, and fifth software 245 for restricting each of the input function, the display function and the sound function.

The storage unit 240 stores a first function restriction level corresponding to the first software, a second function restriction level corresponding to the second software, a third function restriction level corresponding to the third software, a fourth function restriction level corresponding to the fourth software and a fifth function restriction level corresponding to the fifth software, and stores a range of values of corresponding to each of the first function restriction level, the second function restriction level, the third function restriction level, the fourth function restriction level and the fifth function restriction level. For example, a range of values of the first function restriction level may be 1 to 10, a range of values of the second function restriction level may be 11 to 20, a range of values of the third function restriction level may be 21 to 30, a range of values of the fourth function restriction level may be 31 to 40, and a range of values of the fifth function restriction level may be 41 or greater. In addition, a predetermined value for restricting at least one function may be 10.

The storage unit 240 stores priorities of the driving information, the environment information, the driver information and the passenger information, and stores a weight for each priority.

The output units 250 and 260 output information input to the input unit 210 and output operation information corresponding to driving condition information. The output unit includes the display unit 250 configured to output the operation information as an image and the sound unit 260 configured to output the operation information as a sound. The display unit 250 displays information input by the user and displays operation information of a function selected by the user. For example, the display unit 250 may display an image of a text input mode for receiving command information of the user, display operation information of the navigation function such as map and road environment information for route guidance, display a broadcasting image of DMB, display music information of the audio, and display a search image for Internet searching. The display unit 250 may be implemented as a flat display panel such as an LCD, a PDP, and an OLED. In addition, the display unit 250 may be implemented as a touch screen type by further including the touch panel that is integrally formed in the flat display panel. Also, the display unit 250 displays an icon and a cursor for receiving an operation command and displays text selected by an input of the input unit 210. The sound unit 260 may output route and driving information as a sound when route guidance is performed, and also output music and a sound of an image selected by the user and the like.

Furthermore, a terminal according to embodiments of the present disclosure may communicate with the head unit 126 provided in the vehicle, restrict a function of at least one application based on software corresponding to the function restriction level transmitted from the head unit 126, and execute the application whose function is restricted. That is, the head unit 126 provided in the vehicle may include an information collecting unit configured to collect driving information, environment information, driver information and passenger information, a communication unit configured to communicate with the terminal, a control unit configured to determine a function restriction level based on the driving information, the environment information, the driver information and the passenger information and determine software corresponding to the determined function restriction level and a storage unit configured to store the function restriction level.

Figure 6:
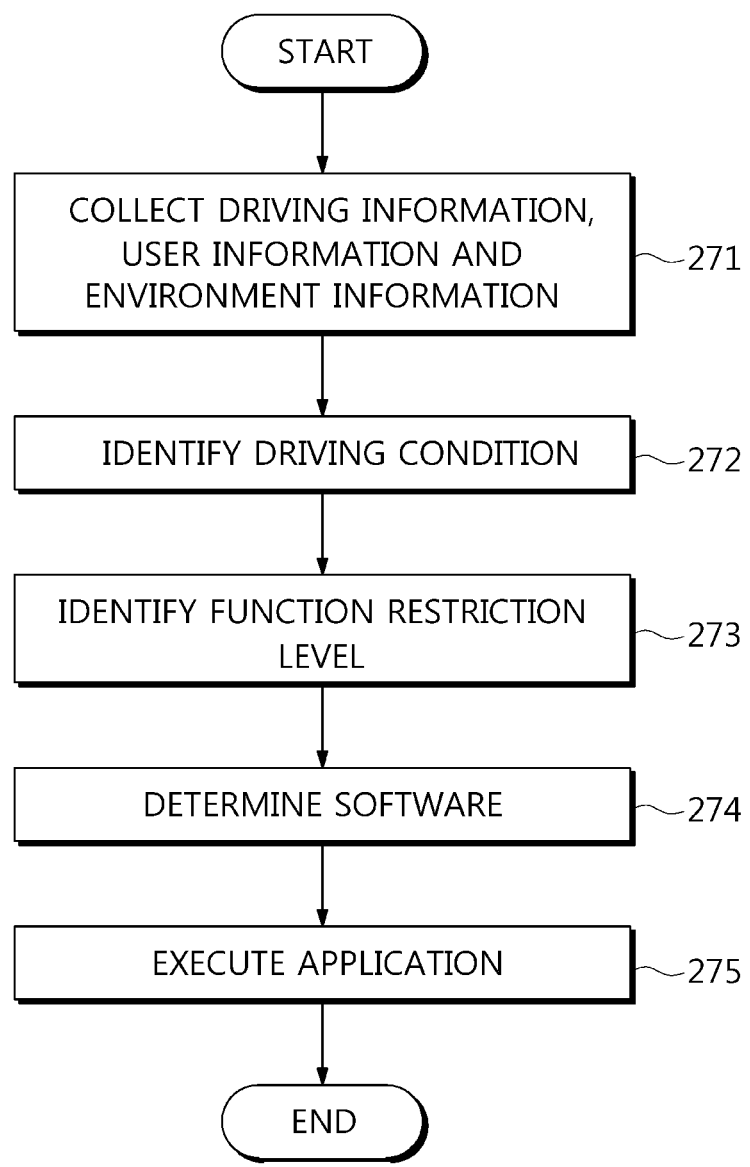
FIG. 6 is a control flowchart of a vehicle in which the terminal according to embodiments of the present disclosure is provided.

FIG. 6 is a control flowchart of a vehicle in which the terminal according to embodiments of the present disclosure is provided.

When the vehicle starts, power is supplied to the terminal. When power is supplied, the terminal provided in the vehicle controls execution of at least one application among the plurality of applications based on an input signal input to the input unit 210. For example, the terminal displays a navigation image and outputs a sound when a navigation application for route guidance is selected, and when a destination is input, requests a route search from the server, and when the route found by the server is transmitted, guides a path based on the received route.

In addition, when the user does not select an application before driving, the terminal may display a waiting screen or a map within a predetermined range based on the location of the vehicle. The vehicle uses various detecting devices provided therein and collects driving information, environment information and user information after starting (271). That is, the vehicle collects information on a speed, a driving direction and a steering angle of the vehicle among the driving information, collects information on a type of a road on which the vehicle travels and weather among the environment information, collects information on a sightline, speaking and a degree of concentration of the driver among the state information of the driver, and collects information on boarding of the passenger and manipulation by the passenger among the user information.

The vehicle transmits the collected driving information, environment information and user information to the terminal. In this case, when the driving information, the environment information and the user information are received, the terminal identifies a driving condition based on the received driving information, environment information and user information (272). That is, the terminal identifies a weight for each speed range of the vehicle, a weight for each driving direction, a weight for each steering angle range, a weight for each type of the road, a weight for each weather condition, a weight for each sightline of the driver, a weight to be applied when a driver is or is not speaking, a weight for each degree of concentration, a weight to be applied when a passenger has or has not boarded, and a weight to be applied when a passenger manipulates or does not manipulates and sums the identified weights, Then, the terminal identifies a function restriction level corresponding to the summed weight (273). This will be described in further detail with reference to FIGS. 7A and 7D.

FIG. 7A is an exemplary diagram showing weights for each driving speed range, weights for each steering angle range, and weights for each driving direction that represent driving information of a vehicle; FIG. 7B is an exemplary diagram showing weights for each sightline direction, weights for each degree of concentration and weights to be applied when a driver is and is not speaking that represent state information of the driver; FIG. 7C is an exemplary diagram showing weights for each road type and weights for each weather condition that represent external environment information; and FIG. 7D is an exemplary diagram showing weights to be applied when a passenger has and has not boarded and weights for each manipulation intention that represent passenger information.

In addition, a range of values of the first function restriction level may be 1 to 10, a range of values of the second function restriction level may be 11 to 20, a range of values of the third function restriction level may be 21 to 30, a range of values of the fourth function restriction level may be 31 to 40, and a range of values of the fifth function restriction level may be 41 or greater. That is, the terminal identifies each weight corresponding to the collected information, sums the identified weights, and identifies a function restriction level in which the summed weight is included. For example, when the collected information includes a driving speed of 40, forward driving, a sightline direction of "forward", a degree of concentration of "high", no speaking, clear weather, and a local road, the summed weight is 10 and a function restriction level in which the summed weight 10 is included is the first function restriction level. In addition, when the collected information includes a driving speed of 70, forward driving, a sightline direction of "forward", a degree of concentration of "medium", no speaking, clear weather and a local road, the summed weight is 12 and a function restriction level in which the summed weight 12 is included is the second function restriction level.

The terminal determines software corresponding to the identified function restriction level as software for executing the application (274), and executes the application using the determined software (275). For example, the terminal enables all functions of the application that is being executed to be executed when the identified function restriction level is the first function restriction level, and restricts an input function of the application that is being executed when the identified function restriction level is the second function restriction level. This will be described in further detail with reference to FIGS. 8A to 10C.

Figure 8A:
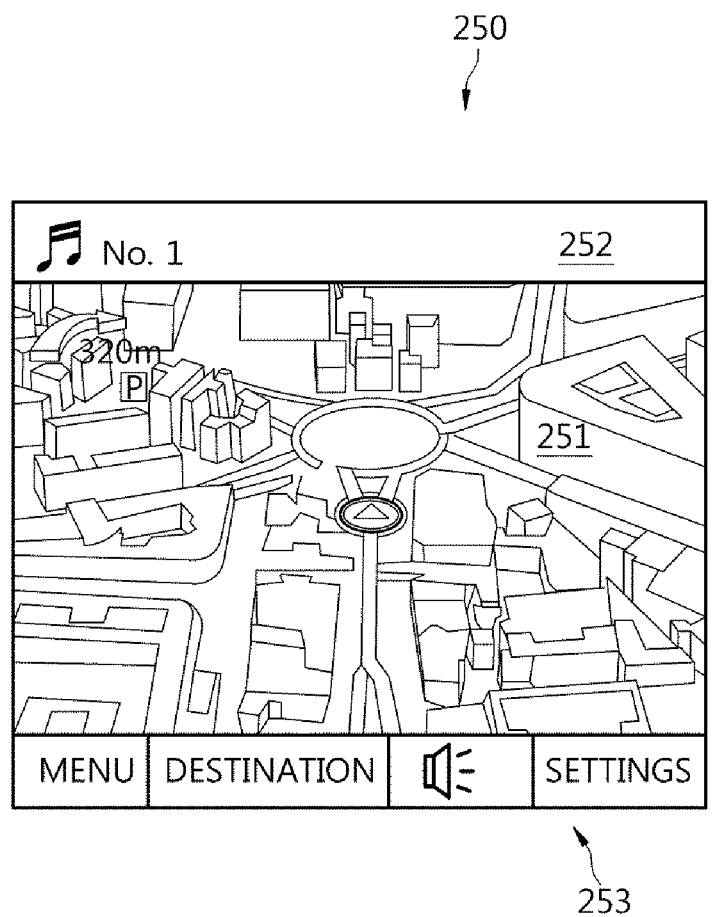
FIGS. 8A to 11B are diagrams illustrating exemplary outputs of the terminal according to embodiments of the present disclosure.

As illustrated in FIG. 8A, when the identified function restriction level is the first function restriction level while the navigation application and an audio reproduction application are executed, the terminal displays an image 251 corresponding to the navigation and an image 252 corresponding to audio reproduction information on the display unit 250, and displays an icon 253 for inputting an operation command of the navigation. Also, the terminal outputs a route guidance sound and an audio sound through the sound unit 260.

Figure 8B:
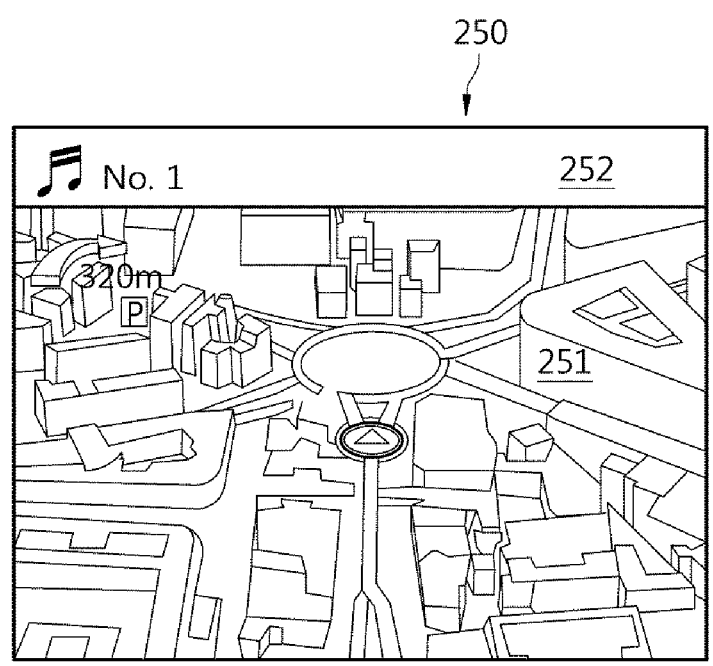

As illustrated in FIG. 8B, when the identified function restriction level is the second function restriction level while the navigation application and the audio reproduction application are executed, the terminal displays the image 251 corresponding to the navigation and the image 252 corresponding to audio reproduction information on the display unit 250 and outputs a route guidance sound and an audio sound through the sound unit 260. In this case, the terminal removes the icon 253 for inputting an operation command of the navigation from the display unit 250.

Figure 9A:
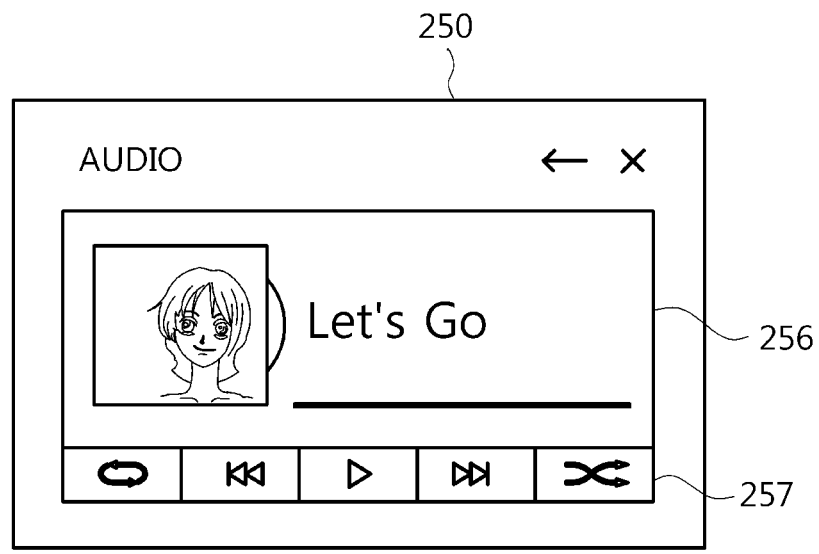

As illustrated in FIG. 9A, when the identified function restriction level is the first function restriction level while the audio reproduction application is executed, the terminal displays an image 256 corresponding to audio reproduction information and an icon 257 for inputting an operation command of audio reproduction on the display unit 250, and outputs an audio sound through the sound unit 260.

Figure 9B:
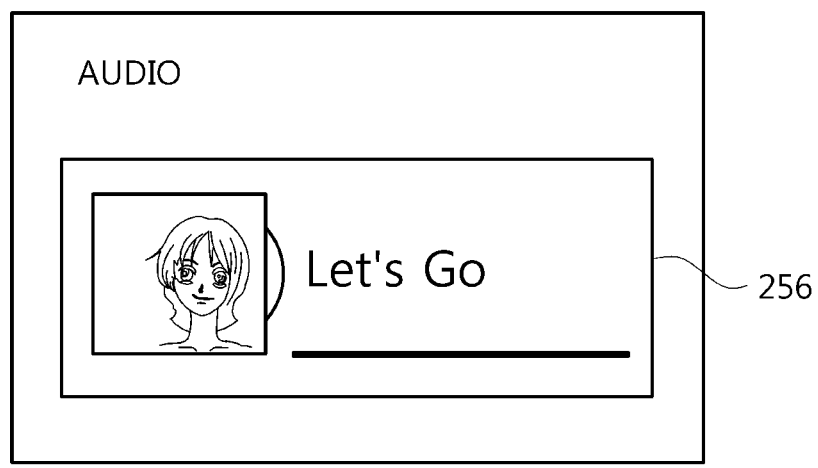

As illustrated in FIG. 9B, when the identified function restriction level is the second function restriction level while the audio reproduction application is executed, the terminal displays the image 256 corresponding to audio reproduction information on the display unit 250 and outputs an audio sound through the sound unit 260. In this case, the terminal removes the icon 257 for inputting an operation command of audio reproduction from the display unit 250.

Figure 9C:

As illustrated in FIG. 9C, when the identified function restriction level is the fourth function restriction level while the audio reproduction application is executed, the terminal removes the image 256 corresponding to audio reproduction information from the display unit 250 and removes the icon 257 for inputting an operation command of audio reproduction from the display unit 250. In this case, the terminal outputs only an audio sound through the sound unit 260.

Figure 10A:
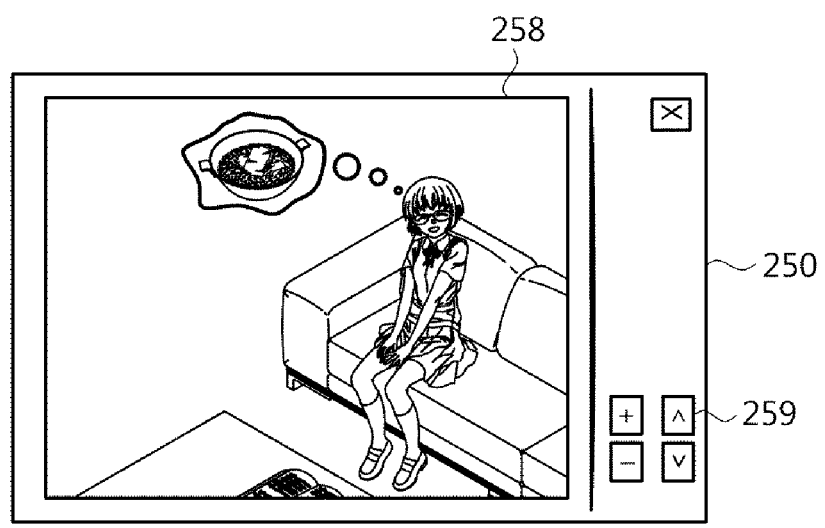

As illustrated in FIG. 10A, when the identified function restriction level is the first function restriction level while a broadcasting application is executed, the terminal displays a broadcasting image 258 on the display unit 250 and displays an icon 259 for inputting an operation command related to broadcasting, and outputs a broadcasting sound through the sound unit 260.

Figure 10B:
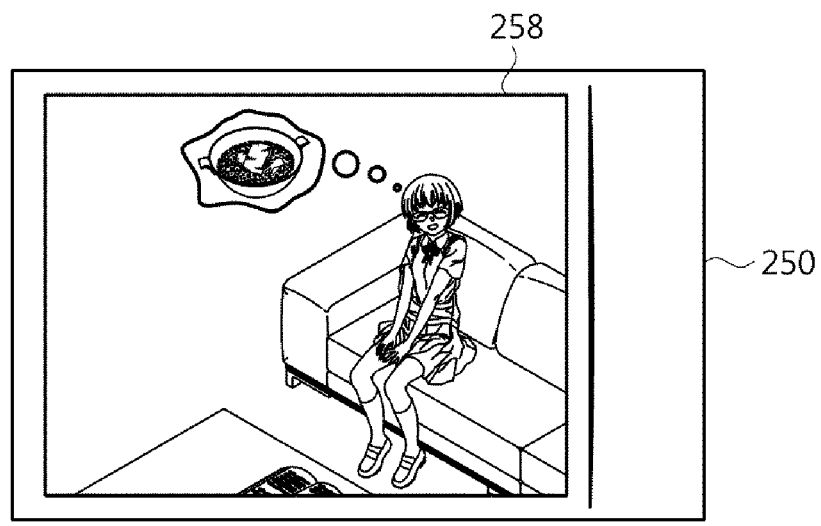
Figure 10C:
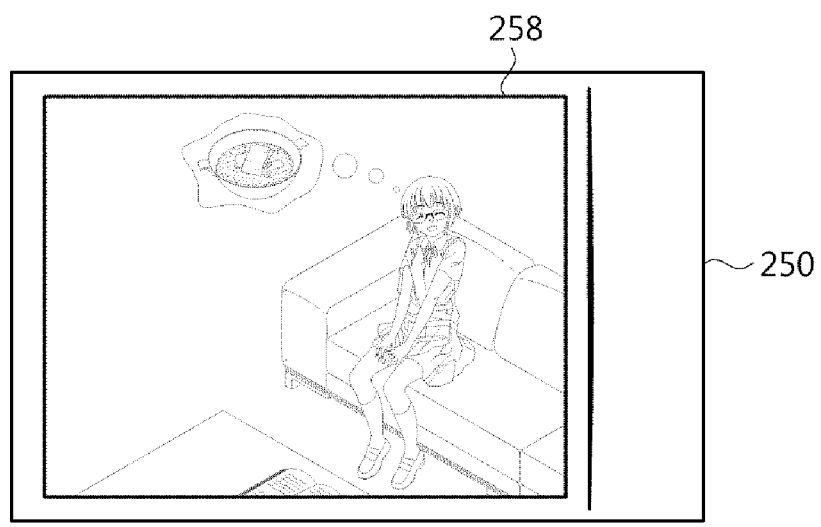

As illustrated in FIG. 10B, when the identified function restriction level is the second function restriction level while the broadcasting application is executed, the terminal displays the broadcasting image 258 on the display unit 250 and outputs an audio sound through the sound unit 260. In this case, the terminal removes the icon 259 for inputting an operation command related to broadcasting from the display unit 250.

As illustrated in FIG. 10O, when the identified function restriction level is the fourth function restriction level while the broadcasting application is executed, the terminal removes the broadcasting image 258 from the display unit 250, removes the icon 259 for inputting an operation command from the display unit 250, and outputs only a broadcasting sound through the sound unit 260. In addition, when the identified function restriction level is the fifth function restriction level while the broadcasting application is executed, the terminal removes the broadcasting image 258 from the display unit 250, removes the icon 259 for inputting an operation command from the display unit 250, and blocks an output of the broadcasting sound. Also, while the navigation application serving as a default application is executed, the terminal compares the summed value and a predetermined value (e.g., a maximum value of the first function restriction level), and when the summed value is equal to or less than the predetermined value, enables each of an input function, a display function and a sound function of the navigation to be executed, or when the summed value is greater than the predetermined value, enables only the display function and the sound function of the navigation to be executed. This will be described with reference to FIGS. 11A-11B.

Figure 11A:
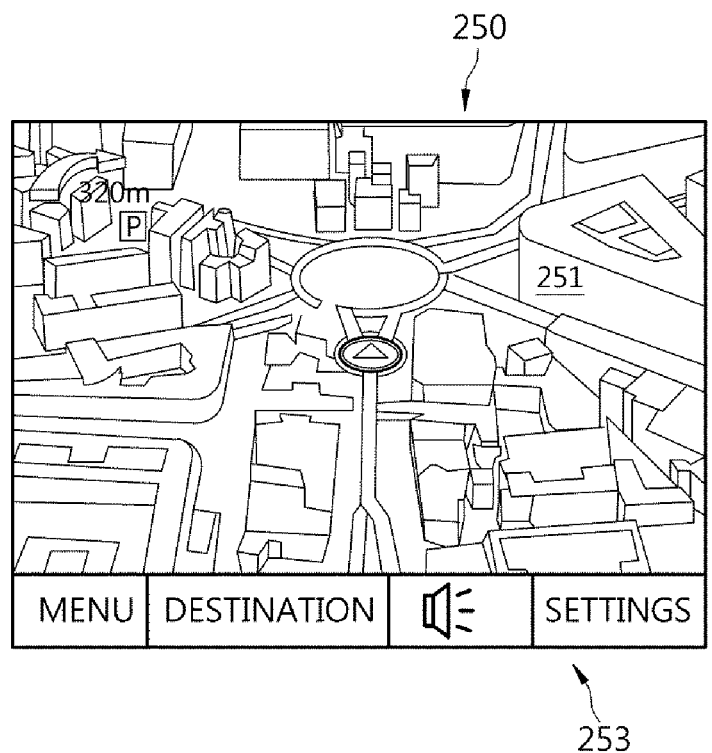

As illustrated in FIG. 11A, when the identified function restriction level is the first function restriction level while the navigation application is executed, the terminal displays the image 251 corresponding to the navigation and the icon 253 for inputting an operation command of the navigation on the display unit 250. Also, the terminal outputs a route guidance sound through the sound unit 260.

Figure 11B:
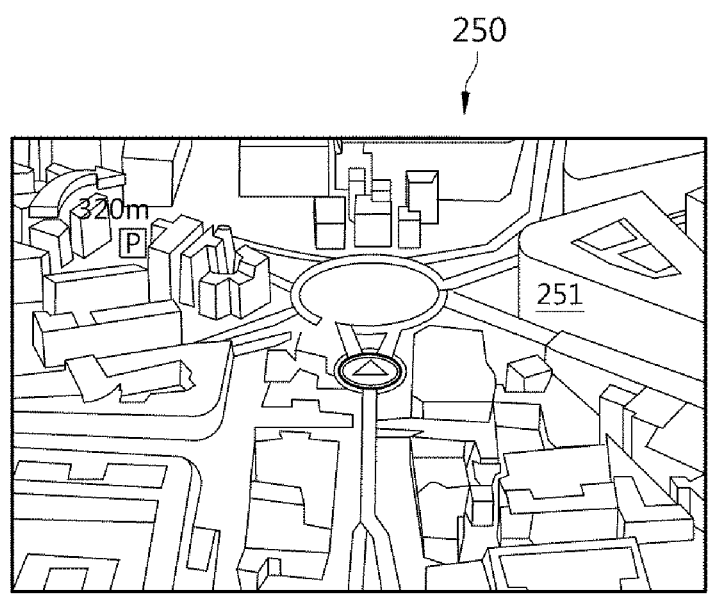

As illustrated in FIG. 11B, when the identified function restriction level is the second function restriction level to the fifth function restriction level while the navigation application is executed, the terminal displays the image 251 corresponding to the navigation corresponding to audio reproduction information on the display unit 250 and outputs a route guidance sound and an audio sound through the sound unit 260. In this case, the terminal removes the icon 253 for inputting an operation command of the navigation from the display unit 250. Also, the terminal may identify priorities of driving information, environment information, driver information and passenger information when the driving condition is identified, and calculate a value for determining a driving condition using a weight of a priority corresponding to the priority and a weight of subcategory information.

A value for determining a driving condition=(weight of priority 1×(sum weights for each piece of subcategory information))+((weight of priority 2×(sum weights for each piece of subcategory information))+ . . . +((weight of priority n×(sum weights for each piece of subcategory information)), where priority n is the last among the priorities. It is assumed that a priority of driving information is 1, a priority of state information of a driver is 2, a priority of environment information is 3, a priority of passenger information is 4, a weight of priority 1 is 4, a weight of priority 2 is 3, a weight of priority 3 is 2, and a weight of priority 4 is 1. In this case, it is assumed that collected information includes a driving speed of 40, forward driving, a sightline direction of "forward", a degree of concentration of "high", no speaking, clear weather, and a local road. A value for determining a driving condition=((4×4)+(4×1))+((3×1)+(3×1)+(3×1))+((2×1)+(2×1)) In this case, a range of values of function restriction levels to which a priority is applied is different from a range of values of function restriction levels to which no priority is applied.

Figure 12:
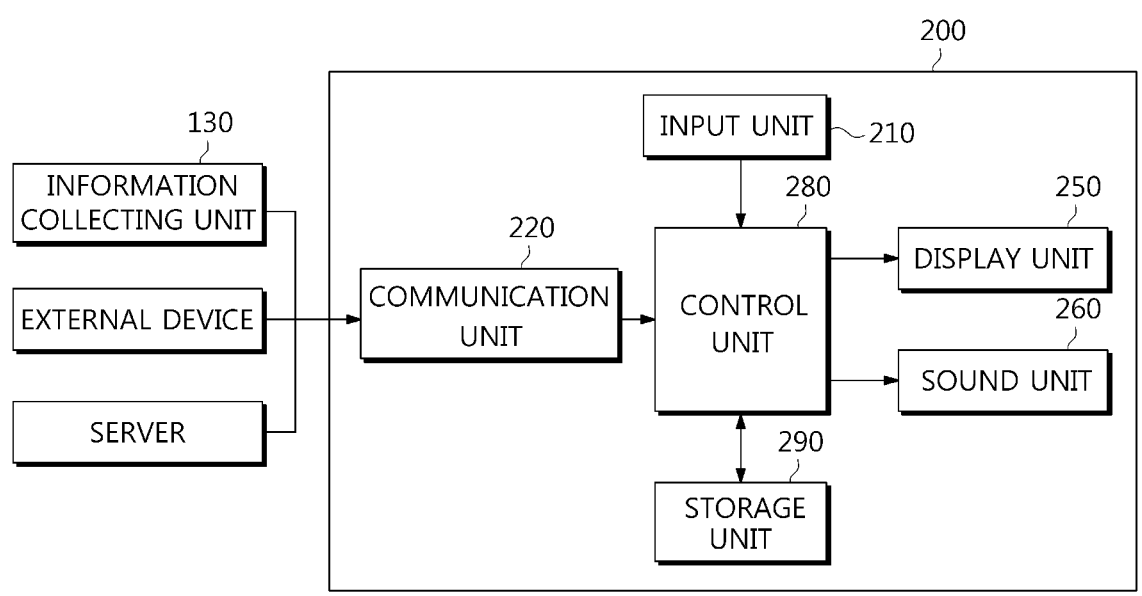
FIG. 12 is a control configuration diagram of a terminal according to embodiments of the present disclosure.

FIG. 12 is a control configuration diagram of a terminal according to embodiments of the present disclosure.

The input unit 210, as described above, receives a command from the user and transmits an input signal to the control unit 280. The communication unit 220, as described above, receives various pieces of information on the inside of the vehicle transmitted from the information collecting unit 130 and transmits the received information to the control unit 280. When the vehicle starts, the control unit 280 enables power for driving of each component to be supplied and controls execution of at least one application among a plurality of applications based on an input signal input to the input unit 210.

The control unit 280 performs control such that, when the user does not select an application before driving, a waiting screen is displayed or a map within a predetermined range based on the location of the vehicle is displayed. The control unit 280 identifies an application input by the user before driving, controls execution of the identified application, and when it is determined that the application is changed, controls execution of the changed application. The control unit 280 determines a driving condition of the vehicle based on at least one piece of information among driving information, environment information and user information, identifies a function restriction level corresponding to the determined driving condition, determines software corresponding to the identified function restriction level, and restricts and controls execution of some applications among the plurality of applications using the determined software. The restricting and controlling of execution of the application includes blocking display of an icon of the application whose execution will be restricted on the display unit 250.

The driving information includes information on a speed, a driving direction and a steering angle of the vehicle, the environment information includes a type of a road on which the vehicle travels and weather information, the state information of the driver includes a sightline, speaking and a degree of concentration of the driver, and the user information includes boarding of the passenger and manipulation by the passenger. More specifically, the control unit 280 identifies a weight for each speed range of the vehicle, a weight for each driving direction, a weight for each steering angle range, a weight for each type of the road, a weight for each weather condition, a weight for each sightline of the driver, a weight to be applied when a driver is or is not speaking, a weight for each degree of concentration of the driver, a weight to be applied when a passenger has or has not boarded, and a weight to be applied when a passenger manipulates or does not manipulates, sums the identified weights, and identifies a function restriction level corresponding to the summed weight.

In addition, the control unit 280 may identify priorities of the driving information, the environment information, the driver information and the passenger information and further apply a weight corresponding to the priority. When the selected application is a default application (e.g., a navigation application), the control unit 280 may always execute the application independently of the function restriction level. According to the function restriction level, the control unit 280 may restrict execution of an application that distracts a sightline and concentration of the driver, or may restrict execution of an application that distracts a sightline and concentration of the driver and causes auditory irritation.

A storage unit 290 stores a plurality of applications and stores a plurality of pieces of software for selectively restricting execution of the plurality of applications. In addition, the storage unit 290 may store the function restriction level and also store information on an application whose execution will be blocked for each function restriction level. The storage unit 290 stores priorities of the driving information, the environment information, the driver information and the passenger information, stores a weight for each priority, and also stores a weight for each piece of subcategory information of driving information, a weight for each piece of subcategory information of environment information, a weight for each piece of subcategory information of driver information, and a weight for each piece of subcategory information of passenger information.

The output units 250 and 260 output information input to the input unit 210 and operation information corresponding to the driving condition information. The output unit includes the display unit 250 configured to output operation information as an image and the sound unit 260 configured to output operation information as a sound. The display unit 250 displays information input by the user and displays operation information of a function selected by the user. For example, the display unit 250 may display an image of a text input mode for receiving command information of the user, display operation information of the navigation function such as map and road environment information for route guidance, display a broadcasting image of DMB, display music information of the audio, and display a search image for Internet searching. The display unit 250 may be implemented as a flat display panel such as an LCD, a PDP, and an OLED. In addition, the display unit 250 may be implemented as a touch screen type by further including the touch panel that is integrally formed in the flat display panel. Also, the display unit 250 displays an icon and a cursor for receiving an operation command and displays text selected by an input of the input unit 210.

The sound unit 260 may output route and driving information as a sound when route guidance is performed, and also output music and a sound of an image selected by the user. An output of a terminal according to embodiments of the present disclosure will be described with reference to FIGS. 13A-13C.

Figure 13A:
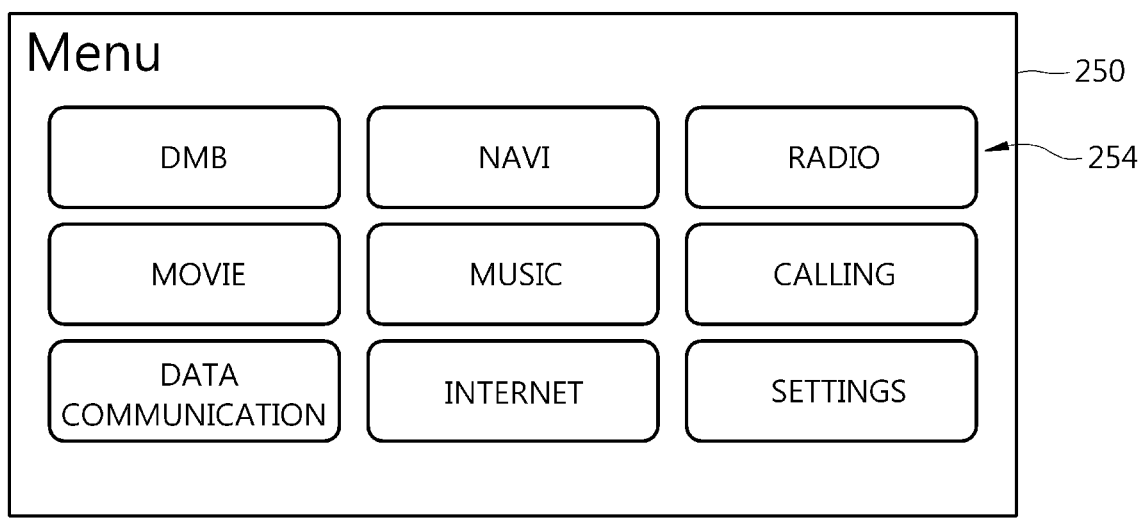
FIGS. 13A-13C is a diagram illustrating an exemplary output of the terminal according to embodiments of the present disclosure.

As illustrated in FIG. 13A, when the identified function restriction level is the first function restriction level while a menu is selected, the terminal displays icons 254 of all applications that can be executed on the display unit 250.

Figure 13B:
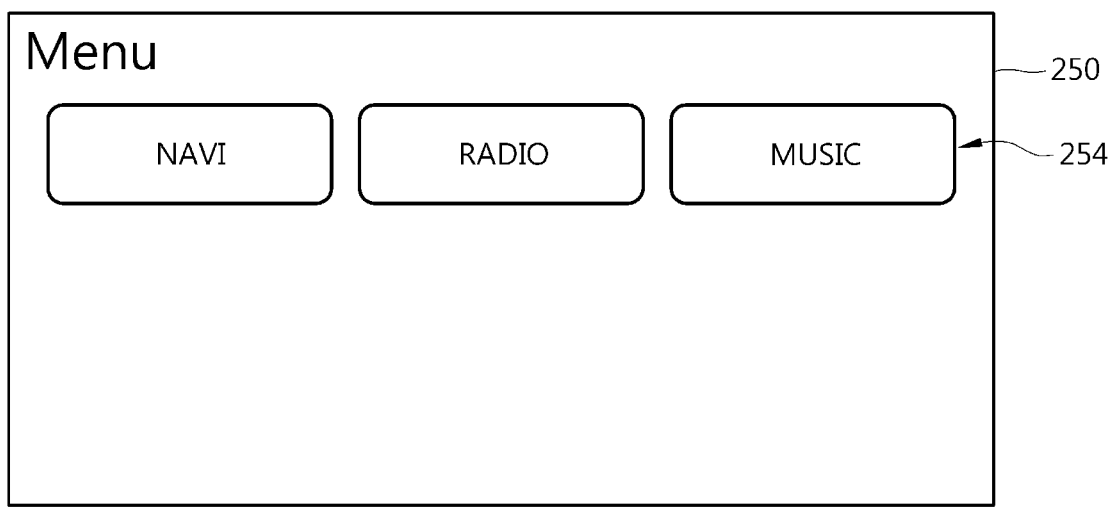

As illustrated in FIG. 13B, when the identified function restriction level is the second function restriction level while the menu is selected, the terminal removes an icon of an application that can distract a sightline and concentration of the driver, and displays only the icon 254 of the remaining applications on the display unit 250. The applications that can distract a sightline and concentration of the driver are generally those that involve images and an input including digital media broadcasting (DMB), movies, the Internet, a telephone, data communication, settings and the like.

Figure 13C:
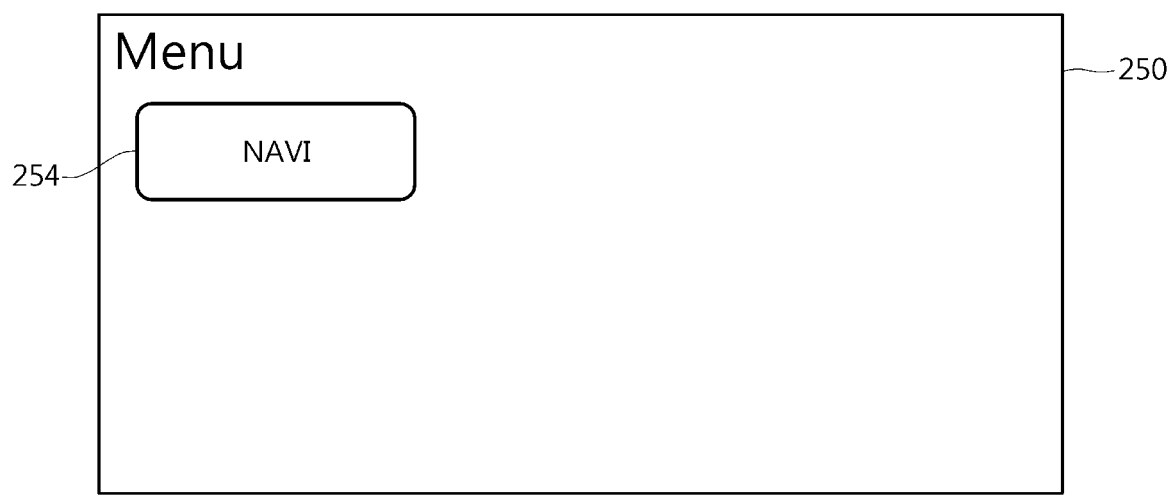

As illustrated in FIG. 13C, when the identified function restriction level is the third function restriction level while the menu is selected, the terminal removes icons of all applications that distract a sightline and concentration of the driver and cause auditory irritation and displays only an icon of the navigation application serving as a default application on the display unit 250. The applications that can distract a sightline, hearing and concentration of the driver are generally those that involve images and an input including DMB, movies, the Internet, telephony, data communication, settings and the like.

In the present disclosure, a function of the application of the terminal is selectively restricted according to vehicle driving information, user information and external environment information. Therefore, it is possible to prevent traffic accidents caused by distraction of a driver. Also, when the vehicle is determined as a dangerous state while driving, an input function of the terminal is restricted. Therefore, it is possible to prevent a sightline of the driver from being distracted and provide stability for the driver. Further, it is possible to decrease a risk of accidents that can be caused when the driver is excessively concentrated on content provided from the terminal. Even further, since a configuration can be generally implemented as software, it is possible to effectively assist safe driving of the vehicle without additional costs. As a result, it is possible to increase quality of the terminal and the vehicle, increase marketability, and improve user convenience and safety of the vehicle.

While the contents of the present disclosure have been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:
1. A terminal, comprising:
a storage unit configured to store a plurality of pieces of software, each having a function restriction level and in which a plurality of functions are selectively restricted, and store a plurality of applications;
a communication unit configured to receive driving information of a vehicle and external environment information;
a control unit configured to identify a function restriction level corresponding to a driving condition of the vehicle based on the received driving information and external environment information, determine software corresponding to the identified function restriction level, and restrict and control a function of at least one application of the plurality of stored applications using the determined software; and
an output unit configured to output execution information of the at least one application whose function is restricted and controlled, wherein:
the communication unit is further configured to receive at least one of state information of a driver of the vehicle and boarding information of a passenger of the vehicle,
the control unit is further configured to identify the state information of the driver and the boarding information of the passenger when the function restriction level is identified,
the driving information includes information relating to one or more of a speed of the vehicle, a driving direction of the vehicle, and a steering angle of the vehicle,
the environment information includes information relating to one or more of a type of a road on which the vehicle travels and weather information indicating a weather condition, and
the state information of the driver includes information relating to one or more of a sightline of the driver, a voice of the driver, and a degree of concentration of the driver.

2. The terminal according to claim 1, wherein:
the storage unit is further configured to store one or more of: a weight for each range of speed of the vehicle, a weight for each driving direction of the vehicle, a weight for each range of steering angle of the vehicle, a weight for each type of the road, a weight for each weather condition, a weight for each sightline of the driver, a weight based on whether the driver is or is not speaking, a weight for each degree of concentration of the driver, a weight based on whether a passenger has or has not boarded the vehicle, and a weight based on whether the passenger is or is not manipulating the terminal, and the control unit is further configured to sum the stored weights and determine the driving condition of the vehicle based on the summed weight.

3. The terminal according to claim 2, wherein the storage unit is further configured to store a priority of the driving information, a priority of the environment information, a priority of the state information of the driver, a priority of the boarding information, and a weight corresponding to the priorities.

4. The terminal according to claim 2, wherein the control unit is further configured to enable each of an input function, a display function, and a sound function when the summed weight is less than or equal to a predetermined value and restrict at least one of the input function, the display function, and the sound function when the summed weight is greater than the predetermined value.

5. The terminal according to claim 2, wherein:
the plurality of pieces of software includes first software for enabling each of an input function, a display function, and a sound function, second software for restricting the input function and enabling the display function and the sound function, third software for restricting the input function and the sound function and enabling the display function, fourth software for restricting the input function and the display function and enabling the sound function, and fifth software for restricting each of the input function, the display function, and the sound function, and
the first software corresponds to a first function restriction level, the second software corresponds to a second function restriction level, the third software corresponds to a third function restriction level, the fourth software corresponds to a fourth function restriction level, and the fifth software corresponds to a fifth function restriction level.

6. A vehicle, comprising:
an information collecting unit configured to collect driving information of a vehicle and external environment information;
a storage unit configured to store a plurality of pieces of software each having a function restriction level and in which a plurality of functions are selectively restricted;
a communication unit configured to receive the driving information of the vehicle and the external environment information;
a control unit configured to identify a function restriction level corresponding to a driving condition of the vehicle based on the driving information and the external environment information and determine software corresponding to the identified function restriction level; and
a terminal configured to store a plurality of applications, restrict and control a function of at least one application of the plurality of stored applications using the determined software, and output execution information of the at least one application whose function is restricted and controlled, wherein:
the communication unit is further configured to receive at least one of state information of a driver of the vehicle and boarding information of a passenger of the vehicle,
the control unit is further configured to identify the state information of the driver and the boarding information of the passenger when the function restriction level is identified,
the driving information includes information relating to one or more of a speed of the vehicle, a driving direction of the vehicle, and a steering angle of the vehicle,
the environment information includes information relating to one or more of a type of a road on which the vehicle travels and weather information indicating a weather condition, and
the state information of the driver includes information relating to one or more of a sightline of the driver, a voice of the driver, and a degree of concentration of the driver.

7. The vehicle according to claim 6, wherein the terminal includes the storage unit, the communication unit, and the control unit.

8. The vehicle according to claim 6, further comprising:
a head unit in which the storage unit, the communication unit, and the control unit are included,
wherein the communication unit is further configured to communicate with the terminal.

9. The vehicle according to claim 6, wherein:
the storage unit is further configured to store one or more of: a weight for each range of speed of the vehicle, a weight for each driving direction of the vehicle, a weight for each range of steering angle of the vehicle, a weight for each type of the road, a weight for each weather condition, a weight for each sightline of the driver, a weight based on whether a driver is or is not speaking, a weight for each degree of concentration of the driver, a weight based on whether a passenger has or has not boarded the vehicle, and a weight based on whether a passenger is or is not manipulating the terminal, and
the control unit is further configured to sum the stored weights and determine the driving condition of the vehicle based on the summed weight.

10. The vehicle according to claim 9, wherein the storage unit is further configured to store a priority of the driving information, a priority of the environment information, a priority of the state information of the driver, a priority of the boarding information, and a weight corresponding to the priorities.

11. The vehicle according to claim 9, wherein the control unit is further configured to enable each of an input function, a display function, and a sound function when the summed weight is less than or equal to a predetermined value and restricts at least one of the input function, the display function, and the sound function when the summed weight is greater than the predetermined value.

12. A method of controlling a vehicle, comprising:
supplying power to a terminal when the vehicle starts;
collecting driving information of the vehicle, external environment information, and boarding information of a user of the vehicle;
identifying a function restriction level corresponding to a driving condition of the vehicle based on the collected driving information of the vehicle, external environment information, and boarding information of the user;
determining software corresponding to the identified function restriction level;
identifying at least one application to be executed in the terminal; and
controlling execution of the identified at least one application using the determined software by restricting and controlling at least one of an input function, a display function, and a sound function of the identified at least one application.

13. The method according to claim 12, wherein:
the driving information includes information relating to one or more of a speed of the vehicle, a driving direction of the vehicle, and a steering angle of the vehicle,
the environment information includes information relating to one or more of a type of a road on which the vehicle travels and weather information indicating a weather condition, and
the state information of the driver includes information relating to one or more of a sightline of the driver, a voice of the driver, and a degree of concentration of the driver.

14. The method according to claim 13, wherein the identifying of the function restriction level comprises:
identifying a weight for each range of speed of the vehicle, a weight for each driving direction of the vehicle, a weight for each range of steering angle of the vehicle, a weight for each type of the road, a weight for each weather condition, a weight for each sightline of the driver, a weight based on whether the driver is or is not speaking, a weight for each degree of concentration of the driver, a weight based on whether a passenger has or has not boarded the vehicle, and a weight based on whether the passenger is or is not manipulating the terminal;
summing the identified weights; and
determining the driving condition of the vehicle based on the summed weight.

15. The method according to claim 14, further comprising:
identifying a priority of the driving information, a priority of the environment information, a priority of the state information of the driver, and a priority of the boarding information; and
determining the driving condition of the vehicle using a weight corresponding to the identified priorities.

16. The method according to claim 15, wherein the controlling of execution of the identified at least one application comprises:
enabling each of the input function, the display function, and the sound function when the summed weight is less than or equal to a predetermined value; and
restricting at least one of the input function, the display function, and the sound function when the summed weight is greater than the predetermined value.

17. The method according to claim 16, wherein the restricting of at least one of the input function, the display function, and the sound function when the summed weight is greater than the predetermined value, comprises:
determining whether the at least one application is a navigation application; and
restricting and controlling an input function of a navigation function of the at least one application when the at least one application is the navigation application.

* * * * *